No. 719,273. PATENTED JAN. 27, 1903.
Z. B. STUART.
APPARATUS FOR TREATING ORES.
APPLICATION FILED MAR. 31, 1902.
NO MODEL.
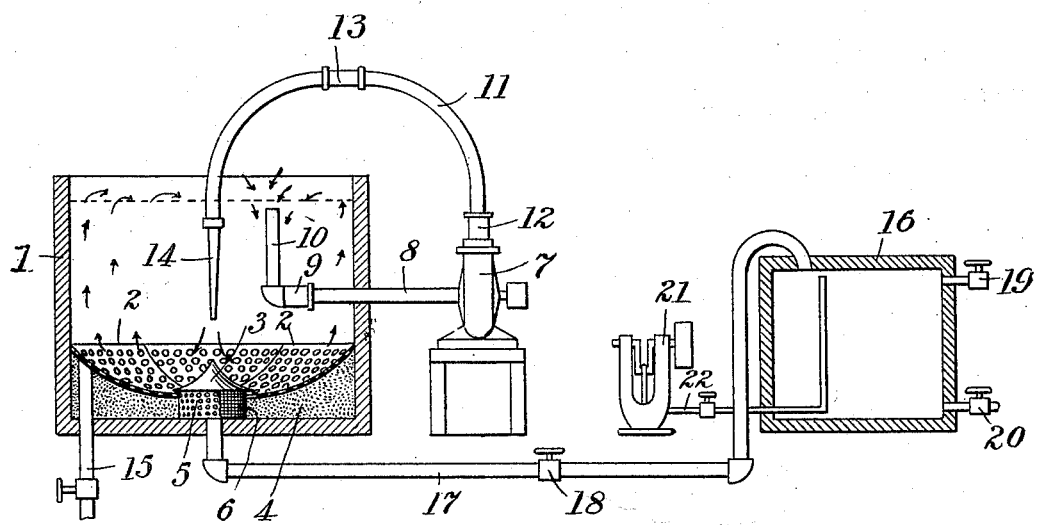
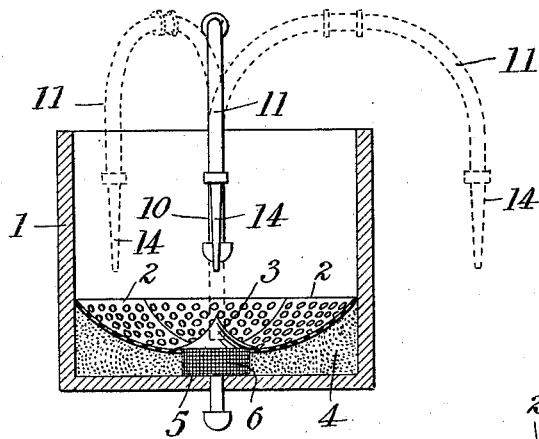
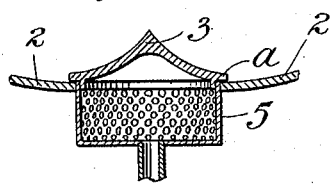
Witnesses:
I. T. Hackley.
E. A. Waterman.
Inventor:
Zebulon B. Stuart.
by Townsend Bros
his attys.

UNITED STATES PATENT OFFICE.

ZEBULON B. STUART, OF LOS ANGELES, CALIFORNIA.

APPARATUS FOR TREATING ORES.

SPECIFICATION forming part of Letters Patent No. 719,273, dated January 27, 1903.

Application filed March 31, 1902. Serial No. 100,821. (No model.)

*To all whom it may concern:*

Be it known that I, ZEBULON B. STUART, a citizen of the United States, residing at Los Angeles, in the county of Los Angeles and State of California, have invented certain new and useful Improvements in Apparatus for Treating Ores, of which the following is a specification.

My invention relates to an apparatus for the treatment of ore wherein the cyanid process is used, and has for its object to provide for a thorough mixing and agitation of the pulp and dissolving agents, to cause a complete suspension of the pulp, thus making a mixture of equal consistency throughout, whereby the action of the cyanid is rendered much more energetic than heretofore. I also provide for an effective oxidation and mixing by giving the mixture a circulation through two receptacles, the mixture being brought to a state of ebullition in one vessel and air mingled therewith and then circulated through another vessel, where a relatively smaller amount of mixture and a relatively larger quantity of air is given a mechanical agitation to further mix it and cause a further oxidation.

My invention also comprises certain details of construction, which will be hereinafter described.

The accompanying drawings illustrate my invention.

Figure I is a side elevation, partly in section, of the complete apparatus. Fig. II is a view of a portion of the apparatus, showing various adjustments of the pipes. Fig. III is a detail of a portion of the filtering apparatus.

1 is a tank having an open top and a concave bottom formed by perforated iron or steel plates 2. In some cases I may employ a wire screen. Projecting upwardly from the center of the bottom of the tank is a conical plate 3.

Under the bottom of the tank 1 is a filter comprising coarse gravel 4 and a perforated box 5. I prefer to cover the outside of the box 5 with a layer of coarse burlaps 6. The position of the box 5 is preferably directly under the conical plate 3 and surrounded by the gravel 4.

7 is a centrifugal pump and mechanical agitator.

8 is a suction-pipe leading from the pump to the interior of the tank and provided with a suitable joint 9, whereby an extended elbow 10 may be adjusted to a suitable position in the tank 1.

11 is a curved discharge-pipe provided with suitable joints 12 and 13, whereby it may be adjusted in various positions. A nozzle 14, carried by the pipe 11, may be arranged to discharge above and directly toward the apex of the conical plate 3.

15 is a drain-pipe for the tank 1.

16 is a vacuum-tank into which the solution may be drawn after being filtered.

17 is a pipe extending from the box 5 to the vacuum-tank 16. The pipe 17 is provided with a suitable valve 18.

19 is an air-inlet valve in the tank 16.

20 is a valve for regulating the discharge of the solution from the tank 16.

21 is a pump for producing a vacuum in the tank 16, and a pipe 22 extends from the pump 21 to the upper portion of the tank 16.

The plates 2 are removable from the tank 1 and rest upon the gravel 4, the weight of the plates and pressure upon them caused by the pulp being sufficient to hold them in position. The plate 3 is likewise removable from the box 5 and is similarly held in place and is provided with a flange a, which extends over the joint between the plates 2 and the box 5, protecting the edges of the plates 2 and preventing small particles from getting into the joint.

In operation the valves 15 and 18 are closed and the pulp, cyanid, and water in suitable proportions are placed in the tank 1 to fill the same to about the dotted line shown. The pump 7 is then put in operation, and the pulp, cyanid, and water are sucked through the pipe 8, given agitation in the pump 7, and then returned to the tank 1 through the pipe 11. The pipe 10 lies so near the surface that as the mixture is drawn in a quantity of air is sucked in with the mixture into the pipe and also into the mixture around the pipe, as indicated by the arrows. The air, which directly enters the pipe, passes with the mixture to the pump 7, where it is caused to be thoroughly mingled with the mixture and promote oxidation. Continued operation of the pump forcibly brings the pulp, cyanid, water, and air into intimate contact. After this mechanical agitation in the pump 7 the mixture is discharged from the nozzle 14 upon the conical plate 3, which causes the mixture to be deflected, as indicated by the arrows, and to rise up through the mixture in the tank and agitate the contained mixture. This operation causes the entire mixture to assume a state of ebullition or boiling, which thoroughly mixes the contents and assists the oxidation and action of the cyanid to such an extent that with what is known as good cyaniding ore the values may be extracted in from three to six hours. The suction on the surface of the mixture caused by the pipe 11 is so great that some air is drawn into the mixture surrounding the pipe 11 besides that which enters the pipe directly, as previously explained. Thus it will be seen that oxidation is effected both in the tank 1 and in the pump 7, the latter obviously performing the function of a pump and also a mechanical agitator. After sufficient time, depending upon the character of pulp, strength of cyanid, &c., the solution may be drained off from the pulp by opening valve 18 and starting the pump 21. The solution is drawn through the filter and through pipe 17 into the tank 16. By opening air-valve 19 to admit air the solution may be drawn from the tank 16 through valve 20 and conducted to suitable zinc boxes. (Not shown.)

The pipe 11 may be swiveled at the joint 12 to allow of its being positioned so as to discharge into other tanks. (Not shown.)

If desired, the tank 1 may be drained through the pipe 15.

What I claim, and desire to secure by Letters Patent of the United States, is—

1. A tank for holding a mixture, means to mingle air with the mixture in the tank and agitate the mixture, and adjustable means embracing a suction-pipe to draw the mixture with an additional amount of air through a circulating and mixing mechanism and further agitate and mix the same and then return the mixture to the tank, and means for raising and lowering the mouth of the suction-pipe.

2. A tank for holding a mixture, means to draw air into the mixture and agitate the contents of the tank, and adjustable means embracing a suction-pipe to draw the contents of the tank together with additional air through a mechanical agitator to further agitate the contents and then return the mixture to the tank, and means for raising and lowering the mouth of the suction-pipe.

3. A tank for holding a mixture, a central portion with raised apex and sloping sides on the bottom of the tank, a mechanical agitator, an adjustable connection between said tank and agitator to convey air from without the tank together with mixture from within the tank to the agitator and to also draw air from without the tank to the mixture which temporarily remains in the tank, and another connection from said mechanical agitator leading to the interior of said tank to convey the mixture back to the tank.

4. A tank having a bottom with a conical part upwardly projecting from the central portion thereof, and means to draw the mixture in the tank through a circulating mechanism and discharge the same upon the conical part.

5. A tank having a bottom with a conical part upwardly projecting from the central portion thereof, and means to draw the mixture and air through a circulating mechanism and discharge the same upon the conical part.

6. A tank having a bottom with a conical part upwardly projecting from the central portion thereof, and means to draw the mixture within the tank together with air from without the tank through a circulating medium and discharge the same upon the conical part.

7. A tank having a bottom with a conical part upwardly projecting from the central portion thereof, means to draw air into the mixture within the tank, and a circulating medium drawing air from without the tank and mixture from within the tank, and discharging the same upon the conical part.

8. A tank having a bottom with a conical part upwardly projecting from the central portion thereof, and a mechanical agitator to draw the mixture within the tank together with air from without the tank through a suitable passage and mix and agitate the same and then cause the same to be discharged upon the conical part.

9. A tank having a bottom with a conical part upwardly projecting from the central portion thereof, and a centrifugal pump to draw the mixture within the tank through a suitable passage and mix the same and then cause the same to be discharged upon the conical part.

10. A tank having a bottom with a conical part upwardly projecting from the central portion thereof, and a centrifugal pump to cause air to be drawn into the mixture into the tank and also to draw air directly, together with the mixture, to the pump and agitate and mix the same and then cause the same to be discharged upon the conical part.

11. A tank having a concave bottom with a conical part upwardly projecting from the central portion thereof, and means to draw the mixture in the tank through a circulating mechanism and then discharge the same upon the conical part.

12. A tank having a concave perforated bottom with a conical part upwardly projecting from the central portion thereof, a filter underneath said bottom, and means to draw the mixture in the tank through a circulating mechanism and then discharge the same upon the conical part.

13. A tank having a concave bottom with a conical part upwardly projecting from the central portion thereof, a pump, a discharge-pipe extending from said pump to a point adjacent the conical part in said tank, and a suction-pipe extending from the interior of said tank to said pump.

14. A tank having a concave bottom with a conical part upwardly projecting from the central portion thereof, a pump, a suction-pipe extending from said pump to and through the mixture in said tank to a point adjacent the upper surface of the mixture, and a discharge-pipe extending from said pump to a point adjacent the conical part in said tank.

15. A tank having a concave bottom with a conical part upwardly projecting from the central portion thereof, a pump, an adjustable suction-pipe extending from said pump to and through the mixture in said tank to a point adjacent the upper surface of the mixture, and an adjustable discharge-pipe extending from said pump to a point adjacent the conical part in said tank.

16. A tank having an open top and a concave bottom formed of perforated removable plates, a conical, removable plate upwardly projecting from the center of the bottom, a perforated box underneath said conical plate, a layer of coarse fabric surrounding said box, a filtering material underneath said perforated plates and surrounding said box, and means to draw the mixture in the tank through a circulating mechanism and discharge the same upon the conical part.

17. A tank having an open top and a concave bottom formed of perforated removable plates, a conical, removable plate upwardly projecting from the center of the bottom, a perforated box underneath said conical plate, a layer of coarse fabric surrounding said box, a filtering material under said perforated plates, and means to draw the mixture within the tank together with air from without the tank through a circulating medium and discharge the same upon the conical part.

18. A tank having an open top and a concave bottom formed of perforated removable plates, a conical, removable plate upwardly projecting from the center of the bottom, a perforated box underneath said conical plate, a layer of coarse fabric surrounding said box, a filtering material under said perforated plates, and a mechanical agitator to draw the mixture within the tank together with air from without the tank through a suitable passage and mix and agitate the same and then cause the same to be discharged upon the conical part.

19. A tank having a bottom with a conical part projecting upwardly from the center thereof, a filter under said bottom, means to draw the mixture together with air through a circulating mechanism and then discharge the same upon said conical part, a vacuum-tank, a pipe connecting said vacuum-tank to said filter, and a pump connected to said vacuum-tank.

20. A tank having an open top and a concave bottom formed of perforated removable plates, a removable, conical plate upwardly projecting from the center of the bottom, a perforated box under said conical plate, a layer of coarse fabric surrounding said perperforated box, a filtering material under said forated plates, a pump, a suction-pipe extending from said pump to and through the mixture in said tank to a point adjacent the upper surface of the mixture, and a discharge-pipe extending from said pump to a point adjacent the conical part in said tank, a vacuum-tank, a pipe connecting said vacuum-tank to said perforated box, and a suction-pump connected to said vacuum-tank.

21. A tank for holding a mixture, means within the tank to cause a circulation of the mixture in said tank whereby said mixture is exposed to air while in said tank, and means to cause said mixture to circulate through a relatively smaller vessel comprising a mechanical agitator wherein a relatively smaller amount of said mixture is mechanically forced into intimate contact with a relatively larger quantity of air.

22. A tank; a pump; a suction-pipe connected with the pump and arranged to draw material from the tank; and a discharge-pipe leading from the pump and discharging said material into the tank, and means below the discharge-outlet and above the lowest part of the bottom of the tank for spreading the material which issues therefrom.

23. A tank to contain a mixture, means to draw the mixture together with air through a circulating mechanism and discharge it into the tank, means for spreading the discharged mixture over the bottom of the tank; a filter under said bottom and communicating with the tank, a vacuum-tank, a pipe connecting said vacuum-tank to said filter and a pump connected to said vacuum-tank.

24. A tank to contain a mixture, a filter under the bottom of the tank and communicating with the tank, means to draw the mixture together with air through a circulating mechanism and then discharge the same into the tank, a vacuum-tank, a pipe connecting said vacuum-tank to said filter, and a pump connected to said vacuum-tank.

In testimony whereof I have signed my name to this specification, in the presence of two subscribing witnesses, at Los Angeles, California, this 25th day of March, 1902.

ZEBULON B. STUART.

Witnesses:
G. T. HACKLEY,
JAMES R. TOWNSEND.